United States Patent [19]

Molbert

[11] 4,031,176

[45] June 21, 1977

[54] METHOD OF INJECTION MOLDING EXPANDED THERMOPLASTICS AND ARTICLES PRODUCED THEREBY

[75] Inventor: Robert A. Molbert, Salem, N.H.

[73] Assignee: The General Tire & Rubber Company, Akron, Ohio

[22] Filed: May 3, 1971

[21] Appl. No.: 139,644

[52] U.S. Cl. .............................. 264/45.2; 264/45.5; 264/90; 264/93; 264/316; 264/328; 264/DIG. 5; 264/DIG. 14; 425/DIG. 124; 428/315

[51] Int. Cl.$^2$ ..................... B29D 27/00; B29C 1/04

[58] Field of Search ............ 264/328, 45, 316, 313, 264/90, 93, 45.2, 51, 314, DIG. 83, 46.8, DIG. 14, 45.5; 425/DIG. 124; 428/315

[56] References Cited

UNITED STATES PATENTS

| | | | |
|---|---|---|---|
| 2,530,289 | 11/1950 | Cook | 264/DIG. 83 |
| 2,658,237 | 11/1953 | Cuppett et al. | 264/313 |
| 2,976,577 | 3/1961 | Gould | 264/45 |
| 2,977,639 | 4/1961 | Barkhuff | 264/45 |
| 2,989,783 | 6/1961 | Slapnik | 264/45 |
| 3,029,472 | 4/1962 | Fischer | 264/DIG. 83 |
| 3,058,161 | 10/1962 | Beyer et al. | 264/DIG. 83 |
| 3,088,172 | 5/1963 | Weinbrenner et al. | 264/45.2 X |
| 3,211,605 | 10/1965 | Spaak | 264/45 X |
| 3,268,635 | 8/1966 | Kraus et al. | 264/DIG. 83 |
| 3,268,636 | 8/1966 | Angell | 264/51 |
| 3,331,904 | 7/1967 | Friedman | 264/32 X |
| 3,378,612 | 4/1968 | Dietz | 264/45 |
| 3,406,229 | 10/1968 | Cenegy | 264/90 X |
| 3,419,134 | 12/1968 | Fitts | 264/45 X |
| 3,505,436 | 4/1970 | Krug | 264/45 |
| 3,576,930 | 4/1971 | Watters et al. | 264/314 X |
| 3,694,529 | 9/1972 | Josephsen et al. | 264/DIG. 83 |
| 3,773,873 | 11/1973 | Spaak et al. | 264/DIG. 83 |
| 3,776,989 | 12/1973 | Annis et al. | 264/DIG. 83 |
| 3,794,706 | 2/1974 | Christie et al. | 264/45.2 X |
| 3,856,902 | 12/1974 | Kirkpatrick | 264/45.2 X |

FOREIGN PATENTS OR APPLICATIONS

| | | | |
|---|---|---|---|
| 242,067 | 1/1963 | Australia | 264/46.8 |
| 1,401,604 | 11/1968 | Germany | 264/46.8 |
| 440,684 | 12/1967 | Switzerland | 264/46.8 |
| 1,226,135 | 3/1971 | United Kingdom | 264/DIG. 83 |

Primary Examiner—Philip Anderson

[57] ABSTRACT

Typically, injection molded expandable thermoplastics exhibit imperfect surfaces in the form of mottled areas, visible flow lines, and pin holes; these imperfections are caused by the quick chilling of the surface of the expanded thermoplastic as it contacts the mold surface. This invention is a method of injection molding expanded thermoplastics free of these defects by injecting a short-shot of the expandable thermoplastic into an elastic membrane positioned within a cooled mold cavity, containing the short-shot within the membrane until a skin forms on the thermoplastic in contact with the membrane, and then permitting expansion of the thermoplastic in the cavity to form a smooth skin or surface on a substantial portion of the article.

9 Claims, 7 Drawing Figures

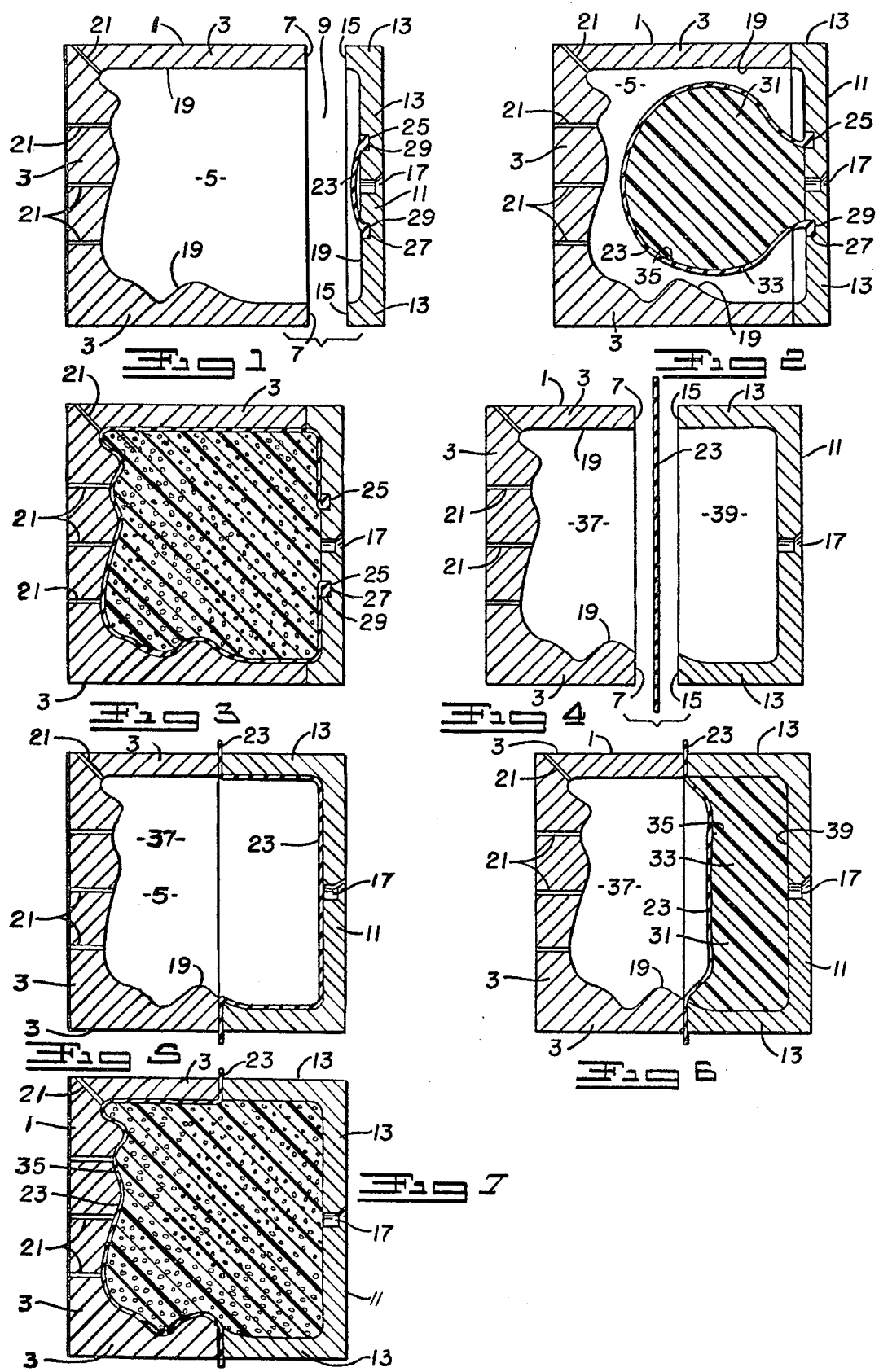

METHOD OF INJECTION MOLDING EXPANDED THERMOPLASTICS AND ARTICLES PRODUCED THEREBY

BACKGROUND OF THE INVENTION

1. Field of the Invention

This invention relates to the field of manufacturing processes for articles of polymeric composition. More particularly, this invention relates to injection molding methods for the manufacture of expanded thermoplastic articles.

2. DESCRIPTION OF THE PRIOR ART

Injection molding of expanded thermoplastics is becoming more commercially feasable as labor and other manufacturing costs continue to rise. The low unit cost of injection molding may be combined with the improved physical properties of recently developed expanded thermoplastics for the production of sturdy articles of low weight, acceptable physical properties, and quite importantly, low manufacturing cost. These expanded articles such as appliance housings, furniture components, objects d'art, etc., are generally in the form of a rigid foamed thermoplastic structure covered by a non-porous and non-foamed skin of the same composition; the thickness of the skin ranging from a few mils to one-eighth of an inch or more.

Characterizing these injection molded expanded thermoplastic articles is a poor quality skin; the defects comprise in the majority swirls, visible flow lines, and mottled colors, as well as pin holes, cracks and fissures. These imperfections are primarily caused by the rapid cooling or chilling of the thermoplastic as it comes into contact with the mold surface in the cavity. The incomplete flow and expansion of these contacting portions of the mold charge are caught and then rapidly solidified. Most molders paint or otherwise mask these surface imperfections. The practice of heating the mold to allow the injected thermoplastic to continue its flow into the mold and complete its expansion prior to chilling or solidification has been found unacceptable as the increased temperature of the mold brings about an exponential increase in the mold cycle (dwell time) that very quickly lowers production rates and raises manufacturing costs to an uneconomical level. Another attempted solution has been the design and use of telescopic molds that utilize a first injection of a skinning material into a telescopically constricted mold cavity so as to form a skin thereover and then a second injection of expandable material into the interior of the first shot with a simultaneous telescopic expansion of the mold cavity to permit the expanding thermoplastic to drive the skinning material outward into contact with the mold surface and form a article having a good skin with an interior foam structure. Such a mold, however, is extremely expensive, and the molding machine is required to accept two completely different polymer compositions.

This invention is a method of injection molding expanded thermoplastic articles that may be practiced in conventional injection molding machines with only a minor amount of modification of the injection mold and may be practiced using cycle times quite near those of conventional injection molding cycles. The articles produced by this invention is characterized by a smooth, evenly colored surface over a substantial portion of the article.

Therefore, the main object of this invention is a method of producing expanded thermoplastic articles by injection molding techniques wherein the article is characterized by having a smooth skin of uniform color over a substantial portion of its surface. Other objects include a method of improving the surface of expanded thermoplastic articles using conventional mold techniques without resorting to expensive telescopic molds; a method of upgrading conventional injection molding techniques for the production of expanded thermoplastic articles; a method of producing expanded thermoplastic articles having a high quality skin and surface coloring without resort to secondary formulations, a method of reducing the time normally required to produce an injection molded expanded thermoplastic of high surface quality, a method of eliminating the requirement for post finishing of injection molded thermoplastic articles, and a method that is relatively easy to practice and that is amenable to automatic and semi-automatic process control. These and other objects of the invention will become more apparent upon a reading of the Description of the Preferred Embodiment in combination with the drawings attached hereto.

DESCRIPTION OF THE DRAWINGS

FIG. 1 shows in cross-sectional view a pair of conventional injection mold members in the opened position with one embodiment of the membrane shown in operable position.

FIGS. 2 and 3 show the successive steps of the method particularized by the membrane shown in FIG. 1, comprising injecting the short-shot of expandable thermoplastic into the cavity and permitting it to expand into the article.

FIG. 4 shows in cross-sectional view a pair of conventional injection mold members in the opened position with another embodiment of the membrane shown in operable position.

FIGS. 5, 6, and 7 show the successive steps of the method particularized by the membrane shown in FIG. 4, comprising deforming the membrane, injecting the short-shot of expandable thermoplastic into the cavity, and permitting it to expand into the article.

SUMMARY OF THE INVENTION

This invention pertains to a method of injection molding an article of expanded thermoplastic to achieve a smooth skin over a substantial portion thereof, comprising the steps of placing a smooth-surfaced, thin, non-porous elastic membrane over the sprue opening in the cavity formed by a pair of closed injection mold members that are maintained at a temperature below about 100° F., injecting a short-shot of molten expandable thermoplastic against the membrane while simultaneously raising the cavity pressure to a level below the injection pressure, and above the thermoplastic expansion pressure, so that the non-expanded thermoplastic forms a pocket in the membrane and gradually cools and develops a smooth skin adjacent the membrane, and then releasing the cavity pressure to permit expansion of the thermoplastic and deformation of the membrane into full conformance with the mold cavity to form the article.

DESCRIPTION OF THE PREFERRED EMBODIMENT

This invention pertains to injection molding techniques wherein the term "injection molding" is defined as a conventional injection molding process involving the rapid injection of a moldable material into a cavity formed by at least a pair of closed mold members. This invention is also directed at the use of expanded thermoplastics, the term "thermoplastic" is used in its conventional sense, which is a polymeric material that is capable of being repeatedly softened by heat and hardened by cooling and includes as examples materials such as styrene polymers and copolymers, acrylics, cellulosics, polyolefins, vinyls, nylons, various fluorocarbons and mixtures thereof. Also included in the term "thermoplastics" are the aforementioned thermoplastics containing minor amounts of ordinary compounding ingredients such as lubricants, stabilizers, antioxidants, fillers, colorants, and small or minor amounts i.e., less than about 10% by weight, of specialty materials including thermosetting plastics which are generally defined as materials that will undergo a chemical reaction by action by heat, catalysts, ultraviolet light, etc., leading to a relatively infusible state, and are exemplified by such materials as amino compounds (melamines and ureas), polyesters, alkyds, epoxides, phenolics and elastomers that are generally defined as substances that can be stretched at room temperature to at least twice their original length and, after having been stretched and the stress removed, return with force to approximately their original length in a short time and are exemplified by such materials as natural rubber, acrylic rubber, Butadiene-Styrene (SBR) rubber, Chloroprene (CR) rubber, Chlorosulfonated Polyethylene rubber, Fluorocarbon rubber, Isobutylene-Isoprene (IIR) rubber, Isoprene (IR) and Butadiene (BR) rubbers, Nitrile-Butadiene (NBR) rubber, ethylene-propylene-diene (EPDM) rubber, Polyisobutylene rubber, Polysulfide rubber, Silicone rubber and Urethane rubber. Two of the more useful thermoplastics in this particular invention are terpolymers of acrylonitrile, butadiene, and styrene generally known as "ABS" resins and polystyrene.

The aforementioned thermoplastics are compounded to expand in the injection molding cycle by action of expansion agents which are generally defined as chemicals that generate inert gasses on heating causing the composition in which they are placed to assume a cellular (or expanded) structure. Typical of these expansion agents are ammonium bicarbonate; ammonium carbonate; surface coated urea; biuret/urea compositions; p,p'-oxybis-(benzenesulfonyl hydrazide); 1,3-diphenyl triazene; azodicarbonamide; 4,4' diphenyl-disulfonyl azide; dinitrosopentamethylenetetramine; N,N'-dimethyl N,N'-dinitrosoterephthalamide; etc. These materials may be used in amounts ranging from 0.1 to 20 parts by weight based on the amount of thermoplastic. There are many articles that may be made from this inventive method including the aforementioned appliance housings, furniture components, as well as other articles such as automobile interior trim, airplane interior components, etc. These articles, made by this novel method, are characterized by a smooth, evenly colored skin over a substantial portion of their surface. By the term "substantial portion" is meant usually greater than about 50% of the surface area and as much as all of the surface except that which is adjacent the sprue hole or holes.

This invention may be practiced with conventional injection mold members which generally comprise blocks of hard materials, usually of metal, that are adapted to come together at highly machined mating surfaces to form at least one fluid tight cavity therein in the shape of the article to be molded. Injection molds are generally made of high quality steel or other ferrous metals; however, this invention may be utilized with other conventional mold materials including, but not limited to, nickel-chrome steel, brass, aluminum, etc.

Referring now to the drawings wherein like elements are identified with like numerals throughout the seven figures, FIG. 1 shows in cross-sectional view, a pair of typical injection mold members in the open position. These members are generally mounted in a molding machine (not shown) and are adapted to move toward and away from each other in controlled alignment. Mold member 1 is shown comprised of mold sides 3 that surround a portion of mold cavity 5 formed therein. The terminal portions of mold side 3 form mold mating edges 7 that surround mold opening 9; edges 7 are machined to a high precision finish. Positioned adjacent but apart from mold member 1 is sprue-containing mold member 11. Mold member 11 is comprised of mold sides 13 that surround a portion of mold cavity 5 formed therein. The terminal portions of mold sides 13 form mating edges 15 that also surround mold opening 9. Mating edges 15 are machined to fit in fluid tight relationship with edges 7 upon closure of mold members 1 and 11 to form mold cavity 5 as shown in FIG. 2. Mold members 1 and 11 are maintained at a temperature below about 100° F throughout the molding cycle for reasons explained later.

Sprue-containing mold member 11 contains at least one sprue 17 that comprises a passageway through member 11 and is adapted to receive the injection nozzle (not shown) from an injection molding machine (not shown) for receipt of a charge of moldable plastic. Mold cavity surface 19 that surrounds mold cavity 5 is usually a polished surface in the outline of the article to be molded therein. Positioned in mold sides 3, and optionally in mold sides 13, are fluid passageways 21 that connect mold cavity 5 with the outside of the respective mold members and throughwhich fluid is directed to pass according to the invention as later described.

Positioned about sprue 17 on mold cavity surface 19 is membrane 23 which comprises a thin, smooth-surfaced, non-porous elastic membrane that is anchored to mold member 11 by anchoring means 25. Anchoring means 25 is shown in FIGS. 1 – 3 to comprise snap-collar 27 that is complementally received in groove 29. The function of means 25 is to anchor membrane 23 to cavity surface 19 in a fluid tight condition to aid in containing a later injected charge of moldable plastic. Means 25 may be of temporary or of permanent construction depending upon the configuration of membrane 23 and may comprise other, well-known anchoring devices such as bolted-in collars, glued-in marginal edges, a threaded base receiving a threaded terminal ring on the membrane, etc.

Membrane 23 is denoted as being "thin;" this term is used herein to indicate a range of thicknesses between about ½ to 20 mils; however, it may be made thicker or thinner for specialized purposes. Membrane 23 should be smooth surfaced so that it will enter into high fidelity conformity with mold surfaces 19 that form the interior of cavity 5 and to easily release from both cavity surface 19 and the article molded therein. Membrane 23 should also be non-porous so that it will contain an injected charge of molten thermoplastic without leakage. Finally, membrane 23 should be constructed of an elastic material so that it will repeatedly and easily deform and stretch of fit the confines to mold cavity 5 without rupturing or otherwise failing. Examples of materials useful as membrane 23 include thin sheets of cured natural rubber, phenolic cured butyl rubber, and other cured rubbery materials, for example acrylic rubber, styrene butadiene rubber, chloroprene rubber, chlorosulfonated polyethylene rubber, fluorocarbon rubber, isobutylene-isoprene rubber, ethylene-propylene-diene terpolymer rubber, isoprene rubber and butadiene rubber, nitrile-butadiene rubber, polyisobutylene rubber, polysulfide rubber, silicon rubber, and urethane rubbers. These rubbers may include minor amounts of other materials, for example, mold release agents, fillers, reinforcing powders, and other compounding ingredients, and synthetic polymeric materials, such as the thermoplastics and thermosetting resins. It should be pointed out that membrane 23 should be treated under processes generally known in the art so as to be non-adherent to both mold cavity surface 19 and to the expanded thermoplastics injected therein, such as by compounding mold release agents into membrane 23 or by applying a coating of mold release agent to both surfaces thereof.

FIG. 2 shows mold member 1 and sprue-containing mold member 11 in closed position and after the injection of short-shot 31 of molten expandable thermoplastic through sprue 17. The injection is accomplished by placing the nozzle portion of the injection mechanism (not shown) against sprue 17 and injecting short-shot 31 through sprue 17 and into cavity 5 and membrane 23 so as to form a pocket therein. The term "short-shot" denotes that the quantity of molten material injected into cavity 5 is less than the total volume of cavity 5; this is so that the molten material may later expand to form a cellular structure within cavity 5. The expandable thermoplastic injected into mold cavity 5 is in a molten state i.e., it is at a temperature sufficient to make it fluid; for acrylonitrile-butadiene-styrene (ABS) resins this temperature may be around 430° F. and for other thermoplastics the temperatures would be polyethylene (120° F. – 170° F.), polyvinyl chloride (300° F. – 360° F.), polystyrene (520° F.), nylon (500° F. – 540° F.), acetal resins (390° F. – 450° F.), etc. In addition the injection is usually conducted in stages, a first stage of high pressure injection (termed "booster") and a second stage of lower pressure injection (termed "injection forward"). Booster stages are usually of shorter duration than injection forward stages, e.g. 4 seconds vs. 6 seconds, and the pressure levels of the stages also vary — booster being higher, e.g., 1200 psi., than injection forward, e.g. 1000- psi. However, the establishment of proper molding conditions for each particular thermoplastic is fully within the ambit of one skilled in the art and should be gained without undue experimentation.

During the injection of molten expandable thermoplastic short shot 31, there should be a simultaneous increase or raising of the pressure within mold cavity 5, via fluid passageways 21 (from a pressurization source that is not shown) so that the cavity pressure increases to a level below that of the injection pressure but above that of the thermoplastic expansion pressure prior to completion of the injection. That is to say, the injection molding machine should be controlled or programmed to cause pressurization of mold cavity 5, during injection of short-shot 31, so that the expandable thermoplastic enters mold cavity 5 and forms a pocket 33 in membrane 23, but does not expand into a cellular structure at this point. The cavity pressure may be most conveniently increased by application of compressed air through passageways 21 into cavity 5 from a pressurization source that is connected through conventional controls with the injection molding machine. Other pressurization fluids may be used in particular instances such as steam, nitrogen, water, etc., however the fluid must be compatible with the material making up membrane 23 i.e., not react with or deteriorate it. The final level of pressurization in cavity 5 should be below the injection pressure (generally 1200 – 1400 p.s.i. in the case of ABS resins and above the thermoplastic expansion pressure (generally 70 to 90 p.s.i. in the case of ABS resins), and has been found to produce the best results at between 100 to 180 psi and more preferably about 140 p.s.i. The term "p.s.i." is used herein to denote "pounds per square inch gauge" pressure.

The pressurization of cavity 5 must be controlled so that the buildup occurs either over a substantial portion of the total injection time or such that membrane 23 is not exposed to the final cavity pressure prior to being deformed by at least part of the thermoplastic charge. This is necessary because membrane 23 tends to rupture in the area of sprue 17 when exposed to full cavity pressure without something (material, mold nozzle, etc.) to abut against it — similar to a tire blowout condition.

Short-shot 31 forms pocket 33 in membrane 23 that generally takes the form of a spherical mass. It is extremely important that short-shot 31 forms this interim configuration within mold cavity 5 prior to expanding into full conformity with mold surface 19. The reason for this is that the rate of heat transfer from short-shot 31 to mold sides 3 is significantly reduced through the combined heat flow resistances of membrane 23 and the compressed air or other fluid in mold cavity 5. This decreased heat transfer rate permits slower cooling of the surface of short-shot 31 and the development of a very thin film or skin 35 on the exterior of the thermoplastic charge adjacent membrane 23. This development of a skin occurs at a rapid rate, albeit at a lower rate than that which would occur if short shot 31 were injected immediately into contact with cavity surface 19. Upon achieving the development of the thin skin adjacent the smooth surface of membrane 23 the pressure in mold cavity 5 is released to permit expansion of the molten thermoplastic by action of the expansion agent and concomitant deformation of membrane 23 into full conformance with mold cavity surface 19 as shown in FIG. 3. Upon expansion of the molten thermoplastic into a cellular structure, thin skin 35, developed adjacent membrane 23, is slightly stretched and placed into conformance with mold cavity surface 19 (separated therefrom by membrane 23) and forms a smooth, evenly colored skin over the article formed therein. The thickness of skin 35 over the article formed in cavity 5 may vary from 0.10 to greater than about 10 mils depending on the thermoplastic and the molding cycle parameters however, it is of the same polymeric composition as that of the cellular structure absent, of course, the cellular structure.

The formation of skin 35 is almost completed by the end of the total injection cycle, i.e., by the time short-shot 31 is fully injected into cavity 5. Thus, the pressure in cavity may be released shortly thereafter; in the case of ABS resins the skin forms rapidly enough to permit release of the cavity pressure immediately after the injection cycle is completed. With other thermoplastics the time may vary one way or the other; the best time for each particular molding situation may be readily determined by trial and error — generally speaking if the cavity pressurization occurs too early in the injection cycle the membrane ruptures; if the pressurization occurs too late the expansion is premature and the surface is of poor quality, if the pressure is released (and optionally a vacuum applied as described later) too early the expansion is premature and the surface is of poor quality, and if the pressure is released (and optionally vacuum used) too late the skin becomes too thick and cracks during expansion.

A separate embodiment of this method is the inclusion of the application of a vacuum to mold cavity 5 after release of the pressure therein, said vacuum being applied via passageways 21 to aid in the expansion of the thermoplastic in short-shot 31.

Skin 35 developed adjacent membrane 23 is developed at a slower rate than would occur upon injection against cavity mold surface 19 so that the skin that is developed is smooth and free of defects such as mottling, swirl patterns, flow lines, and pin holes. The cycle time from the initial injection of short shot 31 into cavity 5, the subsequent release of cavity pressure (and optional application of vacuum), and expansion of thermoplastic into full conformance with surfaces 25 occupies a period of time not significantly greater than conventional injection molding cycle times for similar materials without the practice of this invention.

It is especially important to maintain mold members 1 and 11 at a temperature approaching room temperature, i.e., 70° F., but at least below about 100° F. to permit rapid chilling and setting of the expanded thermoplastic material upon release of the cavity pressure. By maintaining the mold members at temperatures below 100° F. the shin that is formed over the article, is formed rapidly, and the balance of the expanded cellular structure inside the article produced in mold cavity 5 is chilled at a rate that permits demolding within reasonable injection molding cycle times.

Upon demolding of the article shown in mold cavity 5 of FIG. 3, membrane 23 is required to be removed therefrom. For this purpose, anchoring means 25 may be in the form of a temporary anchor such as a spring clip, etc., that may be easily removed from groove 29 in mold member 11, and either membrane 23 peeled from or cut from the article produced therein. Another membrane is then inserted in mold cavity 5.

Another embodiment of the method of this invention is shown in FIGS. 4 – 7. FIG. 4 shows mold members 1 and 11 in an arrangement similar to FIG. 1, except that mold member 11 has extended sides 3 so as to take up more of the surface of the article produced therein. Membrane 23 is placed in cavity opening 9 between open members 1 and 11. Thereafter, the mold members are closed tightly against mating edges 7 and 15 to form fluid tight cavity 5 therein and also to clamp membrane 23 between the mating edges in fluid tight relationship to form a pair of compartments 37 and 39. Thereafter, the air is exhausted from the sprue side compartment 39 to force membrane 23 to deform into conformance with surface 19 of sprue-containing mold member 11. Simultaneously, the opposite side compartment 37 is gradually pressurized to aid in the deformation of membrane 23. Thereafter, (FIG. 6) short shot 31 is injected through sprue 17 against membrane 23, while cavity 5 is simultaneously gradually pressurized to a level below that of the injection pressure and above that of the thermoplastic expansion pressure, so that non-expanded thermoplastic short shot 31 forms a pocket 33 in the sprue side of the mold cavity (compartment 35) bounded by membrane 23 and mold surface 19. That portion of short shot 31 in contact with membrane 33 gradually cools and forms thin smooth skin 35 adjacent thereto. Thereafter, the pressurization in mold cavity 5 is exhausted through fluid passageways 21, and optionally a vacuum is applied thereto, to permit expansion of the short shot 31 and deformation of membrane 23 into full conformance with mold surfaces 19 to form an article having a smooth, thin skin over that portion of the cellular structure in contact with membrane 23. This expansion of shot 31 is shown in FIG. 7. Although the article produced in this embodiment of the invention will have a smooth, unmottled skin, over approximately half of the mold surface, the length of mold sides 3 in either mold members 1 and 11 may be adjusted to obtain a skin over that portion of the articles surface that will be exposed to view and/or wear.

An example of an ABS thermoplastic usable in the practice of this invention is Cycolac JP which is an expandable, injection molding grade acrylonitrilebutadiene-styrene terpolymer resin from Marbon Chemical Company. Another preferred material for use in the practice of this invention is a polystyrene such as Styron 666 polystyrene resin from Dow Chemical Company that is compounded with 2% by weight of Celogen AZ blowing agent obtainable from Uniroyal Corporation.

Following is an example given to show one skilled in the art an indication of how to practice the method of this invention, and to indicate how a conventional injection molding machine may be set up to conduct this inventive method.

EXAMPLE

A conventional screw-type injection molding machine was set up identical with the embodiment shown in FIGS. 4 – 7 and with the conditions shown below in Table I.

TABLE I

| INJECTION MOLDING CONDITIONS | | |
|---|---|---|
| TEMPERATURE | PRESSURE | CYCLE |
| Nozzle 430° F. | Booster- 1200 p.s.i. Injection | Booster -4 sec. |
| Front Zone 450° F. | forward- 1100 p.s.i. | Injection forward - 10 sec. |
| Center Zone 420° F. | Back - 50 p.s.i. | Mold Closed - variable |
| Rear Zone 390° F. | | |
| Mold Members 70° F. | | |

A quantity of Cycolac JP was placed in the feed hopper of the molding machine and the machine started up to commence molding. The pressurization of mold cavity was varied, and the surface smoothness (in microinches) of the article molded therein was measured to obtain an indication of the level of pressurization required to obtain a smooth surface skin. For the purposes of this example, from 1600 and more microinches is considered a rough surface, 1100 to 1600 microinches is considered an improved surface, and below 1100 microinches is considered a smooth surface. In addition, the air pressure and vacuum applied to the cavity (and the membrane) was applied at different times during the process and their effects judged by viewing the article molded in that particular cycle. Further, the mold temperature was varied in combination with the air pressure and with the placement and removal of the membrane in the mold cavity to demonstrate the variation in surface smoothness produced by the method of this invention. Finally, the effects of these latter conditions (mold temperature — membrane placement — air pressure) were also determined for a feed of Styron 666 polystyrene resin from Dow Chemical containing 2% by weight Celogen AZ expansion agent.

A sheet of cured natural rubber 10 mils thick and 36 inch × 36 inches in size was placed over the mold opening and used as the membrane. This material was a smooth surface, elastic, non-porous membrane known as Code 14–125 Rubber Sheet (otherwise known as "Dental Dam") obtainable from Fisher Scientific Company, 711 Forbes Avenue, Pittsburgh, Pennsylvania.

The cavity was pressurized at a linear rate from zero to maximum pressure such that the maximum pressure occurred during the last half of the injection cycle. Thereafter it was immediately exhausted or released (maximum delay after full injection was 0.5 seconds – 0.1 seconds) to permit expansion of the thermoplastic. All of the results are shown below in Tables II, III, and IV.

TABLE II - EFFECT OF CAVITY PRESSURE ON SMOOTHNESS OF ABS MOLDED ARTICLE

TABLE II

| EFFECT OF CAVITY PRESSURE ON SMOOTHNESS OF ABS MOLDED ARTICLE | |
|---|---|
| Maximum Cavity Pressure (psig) | Article Surface Smoothness (microinches) |
| 0 | 1750 |
| 10 | 1750 |
| 75 | 1500 |
| 140 | 900 |

TABLE III - EFFECT OF MOLD TEMPERATURE, USE OF MEMBRANE, AND CAVITY PRESSURE ON SMOOTHNESS OF EXPANDED ABS MOLDED ARTICLE

TABLE III

| EFFECT OF MOLD TEMPERATURE, USE OF MEMBRANE, AND CAVITY PRESSURE ON SMOOTHNESS OF EXPANDED ABS MOLDED ARTICLE | | | |
|---|---|---|---|
| Cavity Mold Temperature | Membrane | Maximum Cavity Pressure (psig) | Article Surface Smoothness (microinches) |
| 70° F | not used | 0 | 1800 |
| 70° F | used | 0 | 1750 |
| 70° F | not used | 140 | incomplete expansion |
| 150° F | not used | 0 | 1500 |
| 70° F | used | 180 | 900 |

TABLE IV - EFFECT OF MOLD TEMPERATURE, USE OF MEMBRANE, AND CAVITY PRESSURE ON SMOOTHNESS OF EXPANDED POLYSTYRENE MOLDED ARTICLE

TABLE IV

| EFFECT OF MOLD TEMPERATURE, USE OF MEMBRANE, AND CAVITY PRESSURE ON SMOOTHNESS OF EXPANDED POLYSTYRENE MOLDED ARTICLE | | | |
|---|---|---|---|
| Mold Cavity Temperature | Membrane | Maximum Cavity Pressure (psig) | Article Surface Smoothness (microinches) |
| 70° F | not used | 0 | 1300 |
| 70° F | used | 0 | 1250 |
| 70° F | used | 100 | 900 |
| 150° F | not used | 0 | 1200 |

This example shows that the skin forms on the injected charge of molten thermoplastic adjacent the membrane during the injection cycle, and that the skin is formed sufficiently at the end of the injection cycle so that, almost immediately, the pressurization in the mold cavity may be released and optionally a vacuum applied to permit full expansion of the thermoplastic. The expansion forces the developed skin into conformity with the mold surface. This indicates that although the molding cycle of this invention is not significantly greater than conventional molding cycles, the interposition of the membrane permits a lower rate of cooling and development of the skin on the thermoplastic and that this novel feature permits an article to be molded by this method that has a smooth evenly colored skin over a substantial portion of its surface.

What is claimed is:

1. A method of injection molding an expanded thermoplastic article to achieve a smooth skin over a substantial portion thereof, comprising the steps of:

a. injecting through a sprue opening in a cavity formed by a pair of closed hard metal injection mold members that are maintained at a temperature below about 100° F., there being attached about and over said sprue opening and interiorly of said cavity a smooth-surfaced, thin, nonporous cured elastic rubber membrane, a short-shot of non-expanded molten expandable thermoplastic into said cavity and against said membrane, while simultaneously increasing the cavity pressure to a level below the injection pressure and above the thermoplastic expansion pressure of said molten non-expanded expandable thermoplastic, so that said non-expanded molten expandable thermoplastic forms a pocket in said membrane and gradually cools and develops a smooth, thin skin adjacent said membrane, and b. releasing the cavity pressure to permit expansion of said thermoplastic and deformation of said membrane into full conformance with the interior surface of said mold cavity to form an expanded article having a smooth, thin skin over that portion in contact with said membrane, said membrane being non-adherent to and releasable from the skin of said article and from the interior surface of said mold cavity.

2. The method of claim 1, wherein a. said membrane is disposed between open injection mold members forming said cavity,
b. said mold members are closed to clamp said membrane therebetween and form a closed divided mold cavity, and,
c. the air from the sprue side of the membrane is exhausted to deform said membrane into conformance with the surface of the sprue-containing mold member.

3. The method of claim 1 wherein the step of releasing the cavity pressure to permit expansion of said thermoplastic includes the application of a vacuum to said expandable cavity to aid the expansion of said thermoplastic.

4. The method of claim 1 wherein said thermoplastic comprises an expandable acrylonitrile-butadiene-styrene resin composition.

5. The method of claim 1 wherein said thermoplastic comprises an expandable polystyrene resin composition.

6. The method of claim 1 wherein the step of raising the cavity pressure to a level below the injection pressure and above the thermoplastic expansion pressure is accomplished with compressed air.

7. A method of injection molding an expanded thermoplastic article to achieve a smooth skin over a substantial portion thereof, comprising the steps of:
a. placing a smooth-surfaced, thin, non-porous cured elastic rubber membrane in the cavity opening between a pair of opened hard metal injection mold members that are maintained at a temperature below about 100° F.;
b. closing said mold members to clamp said membrane therebetween to form a pair of compartments in said cavity;
c. exhausting the air from the sprue-side containing compartment while gradually pressurizing the opposite compartment to deform said membrane into conformance with the surface of the sprue-containing mold member;
d. injecting a short-shot of non-expanded molten expandable thermoplastic through said sprue into said cavity and against said membrane while simultaneously pressurizing said cavity opposite said membrane to a level below the injection pressure and above the thermoplastic expansion pressure so that the non-expanded expandable molten thermoplastic forms a pocket in said membrane and gradually cools and forms a smooth, thin skin adjacent said membrane; and,
e. applying a vacuum to said pressurized cavity portion to permit expansion of said thermoplastic and deformation of said membrane into full conformance with said mold cavity to form an expanded thermoplastic article having a smooth, thin skin over that portion in contact with said membrane, said membrane being non adherent to and releasable from the skin of said article and from the interior surface of said mold cavity.

8. The method of claim 2 wherein said thermoplastic comprises an expandable acrylonitrile-butadiene-styrene resin composition.

9. The method of claim 7 wherein said thermoplastic comprises an expandable polystyrene resin composition.

* * * * *

UNITED STATES PATENT AND TRADEMARK OFFICE
CERTIFICATE OF CORRECTION

PATENT NO. : 4,031,176
DATED : June 21, 1977
INVENTOR(S) : Robert A. Molbert

It is certified that error appears in the above-identified patent and that said Letters Patent are hereby corrected as shown below:

Column 11, line 11 & 12, which reads: "said thermoplastic" should read ---said expandable thermoplastic---.

Column 11, line 13, which reads: "said expandable cavity" should read ---said cavity---.

Signed and Sealed this

Twentieth Day of September 1977

[SEAL]

Attest:

RUTH C. MASON
Attesting Officer

LUTRELLE F. PARKER
Acting Commissioner of Patents and Trademarks